United States Patent
Cai et al.

(10) Patent No.: US 10,272,481 B2
(45) Date of Patent: Apr. 30, 2019

(54) SYSTEM FOR CONSOLIDATING HYDRAULIC RECLAMATION SILT BY COMBINED FLOCCULATION AND DEEP BOOSTED VACUUM PRELOADING, AND METHOD FOR CONSOLIDATING HYDRAULIC RECLAMATION SILT

(71) Applicant: WENZHOU UNIVERSITY, Wenzhou, Zhejiang Province (CN)

(72) Inventors: Yuanqiang Cai, Wenzhou (CN); Jun Wang, Wenzhou (CN); Hongtao Fu, Wenzhou (CN); Zhiwei Xie, Wenzhou (CN); Peng Wang, Wenzhou (CN); Junfeng Ni, Wenzhou (CN); Ziquan Fang, Wenzhou (CN); Haisheng Jin, Wenzhou (CN); Changchen Zhou, Wenzhou (CN); Jinqiang Jin, Wenzhou (CN); Youchang Lv, Wenzhou (CN)

(73) Assignee: WENZHOU UNIVERSITY, Wenzhou (CN)

( * ) Notice: Subject to any disclaimer, the term of this patent is extended or adjusted under 35 U.S.C. 154(b) by 0 days.

(21) Appl. No.: 15/712,954

(22) Filed: Sep. 22, 2017

(65) Prior Publication Data

US 2018/0339325 A1 Nov. 29, 2018

(30) Foreign Application Priority Data

May 23, 2017 (CN) .......................... 2017 1 0367163

(51) Int. Cl.
*B09C 1/02* (2006.01)
*B09C 1/08* (2006.01)
*B09C 1/00* (2006.01)

(52) U.S. Cl.
CPC ............... *B09C 1/08* (2013.01); *B09C 1/005* (2013.01); *B09C 1/02* (2013.01)

(58) Field of Classification Search
CPC ..................................... B09C 1/00; B09C 1/02
See application file for complete search history.

(56) References Cited

U.S. PATENT DOCUMENTS 4,176,058 A * 11/1979 Grobler .................... B03D 3/02
   210/632
4,214,887 A * 7/1980 van Gelder ............. C02F 11/00
   71/9

(Continued)

FOREIGN PATENT DOCUMENTS

DE        3607471 A1 * 8/1987 ............... B09C 1/02
JP       10034199     *  2/1998
JP     2009202089 A  *  9/2009

OTHER PUBLICATIONS

Translation of JP-2009202089.*

*Primary Examiner* — Frederick L Lagman
(74) *Attorney, Agent, or Firm* — Jiwen Chen

(57) ABSTRACT

The present invention discloses a system for consolidating hydraulic reclamation silt by combined flocculation and deep boosted vacuum preloading, comprising an agitation tank, wherein the agitation tank is connected to a flocculant preparation tank and a slurry delivery device; a tank bottom valve and a filter plate mechanism are successively arranged at a lower delivery port of a precipitation zone of a dehydration tank; weep holes are formed on filter plates; there is a discharge zone below the precipitation zone of the dehydration tank; a drainage plate is provided on an upper side wall of the precipitation zone; a water storage coaming is provided outside the drainage plate; the water storage coaming and the drainage plate are enclosed to form a water storage zone; the water storage zone is connected to a reservoir via a second delivery pipe with a second delivery pump provided thereon; a water pumping port is provided within the discharge zone; the water pumping port is con- (Continued)

nected to the reservoir via a third delivery pipe with a third delivery pump provided thereon; and, the discharge valve below the discharge zone is connected to a deep boosted drainage tank. The present invention further provides a method for consolidating hydraulic reclamation silt by using the system. The system and the method for consolidating hydraulic reclamation silt implemented by the system can more thoroughly discharge water in the slurry, so that the soil becomes drier and harder and can be directly used in the landfill of earthwork; moreover, a greater amount of water can be collected.

6 Claims, 2 Drawing Sheets

(56) References Cited

U.S. PATENT DOCUMENTS

| | | | | |
|---|---|---|---|---|
| 4,600,508 A * | 7/1986 | DeGhetto | ................ | B09C 1/02 210/170.07 |
| 5,232,584 A * | 8/1993 | Wang | .................... | B01D 53/46 210/139 |
| 5,265,978 A * | 11/1993 | Losack | .................... | B09C 1/005 134/21 |
| 5,286,140 A * | 2/1994 | Mather | .................... | B09C 1/10 210/610 |
| 5,462,672 A * | 10/1995 | Iji | ............................. | C02F 1/56 210/727 |
| 6,245,121 B1 * | 6/2001 | Lamy | .................... | B01D 61/04 71/1 |
| 6,432,303 B1 * | 8/2002 | Chesner | ............... | B01D 61/145 210/170.04 |
| 6,926,465 B1 * | 8/2005 | Mann | .................... | B01D 21/01 405/128.45 |
| 2002/0113017 A1 * | 8/2002 | Sheets | ....................... | B09B 3/00 210/660 |
| 2002/0195400 A1 * | 12/2002 | Taylor, Jr. | ................. | B09B 3/00 210/741 |
| 2004/0168976 A1 * | 9/2004 | Inaba | ........................ | C02F 3/10 210/605 |
| 2007/0205163 A1 * | 9/2007 | Butters | .................... | C02F 1/44 210/749 |
| 2009/0148238 A1 * | 6/2009 | Smith | ....................... | B09B 1/00 405/129.2 |
| 2010/0282683 A1 * | 11/2010 | Zhong | ..................... | C02F 11/14 210/666 |

* cited by examiner

SYSTEM FOR CONSOLIDATING HYDRAULIC RECLAMATION SILT BY COMBINED FLOCCULATION AND DEEP BOOSTED VACUUM PRELOADING, AND METHOD FOR CONSOLIDATING HYDRAULIC RECLAMATION SILT

This application claims the priority benefit of Chinese Application No. 201710367163.7 filed May 23, 2017, which is hereby incorporated by reference.

TECHNICAL FIELD OF THE INVENTION

The present invention relates to a system for consolidating hydraulic reclamation silt by combined flocculation and deep boosted vacuum preloading. The present invention further relates to a method for dehydration by using the system for consolidating hydraulic reclamation silt by combined flocculation and deep boosted vacuum preloading.

BACKGROUND OF THE INVENTION

In the conventional flocculation and dehydration test equipment, generally, a flocculant needs to be added and then agitated to form supernatant water and lower-layer slurry in an agitation tank. The supernatant water is pumped and drained through pipelines. After the supernatant water is pumped and drained, there is often a great amount of water in the slurry, and the water in the slurry cannot be drained during the pumping and drainage of the supernatant water. Accordingly, water will not be pumped and drained completely, and the remaining slurry cannot be directly utilized due to a too high content of water.

SUMMARY OF THE INVENTION

In view of the deficiencies in the art, a technical problem to be solved by the present invention is to provide a system for consolidating hydraulic reclamation silt by combined flocculation and deep boosted vacuum preloading, which can more thoroughly discharge water in the slurry. The technical problem to be solved by the present invention is to further provide a method for dehydration by the system for consolidating hydraulic reclamation silt by combined flocculation and deep boosted vacuum preloading.

Hence, the present invention provides a system for consolidating hydraulic reclamation silt by combined flocculation and deep boosted vacuum preloading, comprising an agitation tank, the agitation tank being connected to a flocculant preparation tank and a slurry delivery device, wherein the agitation tank is connected to a dehydration tank via a first delivery pipe with a first delivery pump provided thereon; a precipitation zone is formed in an upper portion of the dehydration tank; a lower delivery port is provided at a lower end of the precipitation zone; a tank bottom valve and a filter plate mechanism are successively arranged at the lower delivery port; the filter plate mechanism comprises filter plates which can be turned to open or close; weep holes are formed on the filter plates; the opening or closing of the filter plates is controlled by a hydraulic cylinder having a telescopic rod; there is a discharge zone below the precipitation zone of the dehydration tank; a discharge valve is provided on the bottom of the discharge zone; a drainage plate is provided on an upper side wall of the precipitation zone; a water storage coaming is provided outside the drainage plate; the water storage coaming and the drainage plate are enclosed to form a water storage zone; the water storage zone is connected to a reservoir via a second delivery pipe with a second delivery pump provided thereon; a water pumping port is provided within the discharge zone; the water pumping port is connected to the reservoir via a third delivery pipe with a third delivery pump provided thereon; and, the discharge valve below the discharge zone is connected to a deep boosted drainage tank.

The present invention further provides a method for consolidating hydraulic reclamation silt by using the system for consolidating hydraulic reclamation silt by combined flocculation and deep boosted vacuum preloading, comprising the following steps of:

A. activating a slurry delivery device to deliver slurry to an agitation tank, adding a flocculant into a flocculant preparation tank to mix with water at a certain ratio, and quantitatively delivering the flocculant to the agitation tank according to the delivery amount of the slurry;

B. activating the agitation tank to agitate and mix the slurry with the flocculant;

C. delivering the agitated slurry to a precipitation zone of a dehydration tank, standing the slurry to form slurry in a lower layer and clear water in an upper layer within the precipitation zone, and feeding clear water into a water storage zone through a drainage plate and then draining the clear water to a reservoir via a second delivery pipe;

D. after the clear water is drained, opening a tank bottom valve to allow water in the slurry to further flow into a discharge zone through weep holes on filter plates, and draining the water into the reservoir through a water pumping port in the discharge zone and a third delivery pipe;

E. controlling a telescopic rod of a hydraulic cylinder to open the filter plates, discharging the slurry, and delivering the slurry into the deep boosted drainage tank through pipelines;

F. allowing a delivery pipe with ballheads to pass through a sleeve to connect a metal drill bit, allowing the sleeve to be in threaded connection to the metal drill bit, and striking the sleeve with the metal drill bit into deep soil by a striking device;

G. reversely turning the sleeve to separate the sleeve from the metal drill bit, pulling the sleeve out from the soil, and repeating the operations in the steps A and B to strike all the metal drill bit, the ballheads and the delivery pipe into the soil;

H. sealing the soil, and connecting double channels of the delivery pipe to the vacuum preloading drainage system and the boosting system, respectively;

I. activating a pumping and drainage device in the vacuum preloading drainage system to preliminarily drain water in the soil; and J. activating a boosting and air-filling device in the boosting system together with the pumping and drainage device to apply air and a pressure to the soil through the channels in the delivery pipe and the ballheads so that the air filled into the soil squeezes the surrounding water into the pumping and drainage device to be then drained and collected through the pumping and drainage device.

The present invention has the following beneficial effects: water in the slurry can be discharged more thoroughly, and insufficient dehydration resulted from the defects of the dehydration equipment in conventional tests is avoided, so that a greater amount of water is collected, and the dehydrated soil has a lower content of water and may be directly used in the landfill of earthwork.

DETAILED DESCRIPTION OF THE INVENTION

Figure 1:
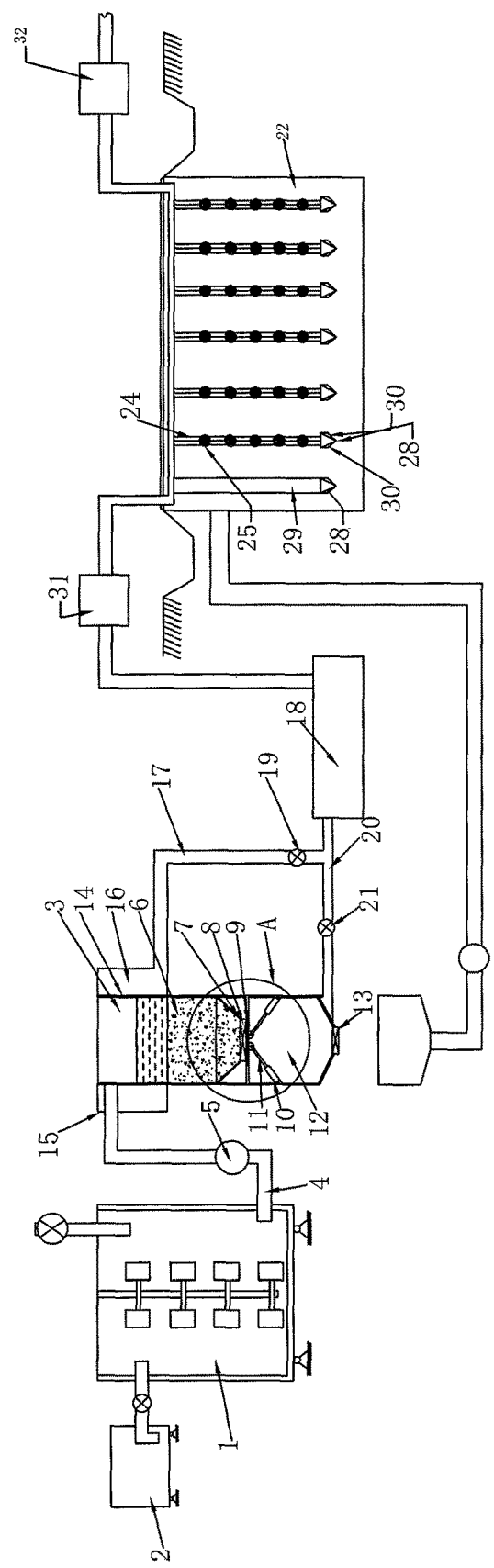
FIG. 1 is a structural diagram of a system for consolidating hydraulic reclamation silt by combined flocculation and deep boosted vacuum preloading according to the present invention.
Figure 2:
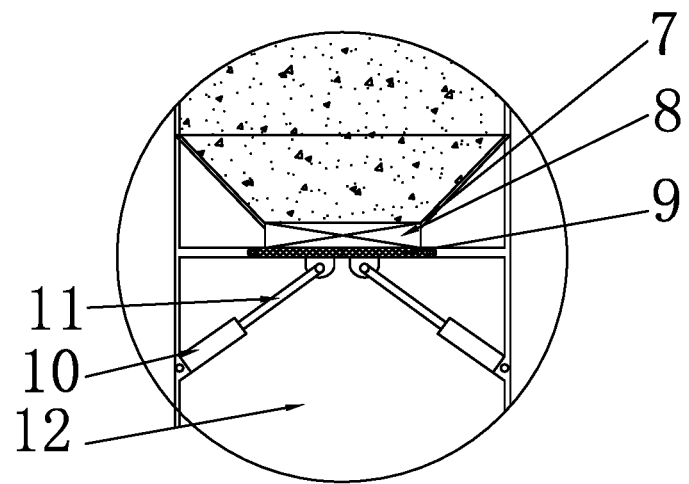
FIG. 2 is a partially enlarged view of part A of FIG. 1.
Figure 3:
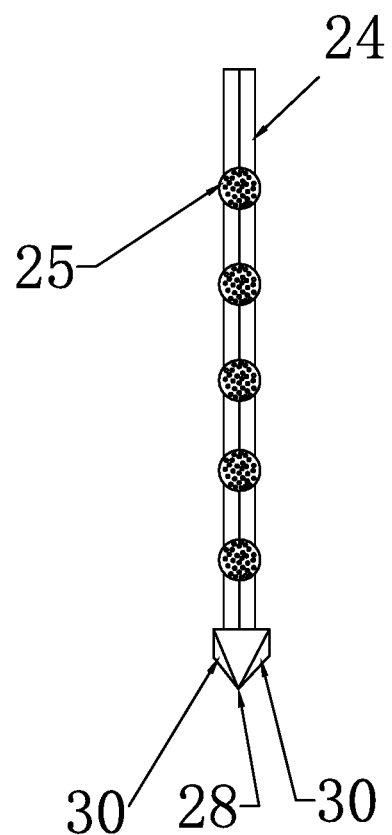
FIG. 3 is an enlarged structural diagram of a boosted pumping and drainage pipe of FIG. 1.

Referring to FIGS. 1, 2 and 3, the present invention provides a flocculation and dehydration device, comprising an agitation tank 1. The agitation tank 1 is connected to a flocculant preparation tank 2 and a slurry delivery device. The agitation tank 1 is connected to a dehydration tank 3 via a first delivery pipe 4 with a first delivery pump 5 provided thereon. A precipitation zone 6 is formed in an upper portion of the dehydration tank 3. A lower delivery port 7 is provided at a lower end of the precipitation zone 6. A tank bottom valve 8 and a filter plate mechanism are successively arranged at the lower delivery port 7. The filter plate mechanism comprises filter plates 9 which can be turned to open or close. Weep holes are formed on the filter plates 9. The opening or closing of the filter plates 9 is controlled by a hydraulic cylinder 10 having a telescopic rod 11. Generally, the filter plates 9 comprise two opposed filter plates 9, the bottom of each of the filter plates 9 is hinged to an end of the telescopic rod 11, and a lower end of the hydraulic cylinder 10 is hinged to a side wall of the dehydration tank 3. There is a discharge zone 12 below the precipitation zone 6 of the dehydration tank 3. A discharge valve 13 is provided on the bottom of the discharge zone 12. A drainage plate 14 is provided on an upper side wall of the precipitation zone 6. A water storage coaming 15 is provided outside the drainage plate 14. The water storage coaming 15 and the drainage plate 14 are enclosed to form a water storage zone 16. The water storage zone 16 is connected to a reservoir 18 via a second delivery pipe 17 with a second delivery pump 19 provided thereon. A water pumping port is provided within the discharge zone 12. The water pumping port is connected to the reservoir 18 via a third delivery pipe 20 with a third delivery pump 21 provided thereon. The discharge valve 13 below the discharge zone 12 is connected to a deep boosted drainage tank 22.

Referring to FIGS. 1 and 3, in this embodiment, the deep boosted drainage tank 22 comprises a vacuum preloading drainage system and a boosting system. Both the vacuum preloading drainage system and the boosting system realize pressurization and water drainage by a boosted pumping and drainage pipe 23. The boosted pumping and drainage pipe 23 comprises a delivery pipe 24 with double pipelines. Ballheads 25 having through holes densely distributed thereon are provided on the delivery pipe 24. Each ballhead 25 is at least communicated with one of the double pipelines. The double pipelines are connected to the boosting system and a pumping and drainage system above the soil, respectively. A metal drill bit 28 is provided at a lower end of the delivery pipe 24. A rear portion of the metal drill bit 28 is in threaded connected to a sleeve 29. The metal drill bit 28 is provided with at least two baffles 30. Both the delivery pipe 24 and the ballheads 25 are located within the sleeve 29. The ballheads 25 comprise boosting ballheads and pumping and drainage ballheads, and the boosting ballheads and the pumping and drainage ballheads are successively distributed in a height direction at intervals. The system may further facilitate the dehydration of the soil, and also has the following three advantages: A. after the delivery pipe 24 and the ballheads 25 are sheathed into the metal drill bit 28 and the sleeve 29, the metal drill bit 28 and the sleeve 29 can be stricken into the soil more deeply, and the construction is more convenient and quicker; B. the contact area of the ballheads 25 with the soil becomes larger, so that the efficiency of pumping and drainage is higher; C. the double pipelines in the delivery pipe 24 can realize air-filling, and pumping and drainage, respectively, and the ballheads 25 used for pumping and drainage and the ballheads 25 used for boosting can be arranged in proximity to each other, so that the drainage effect after boosting is improved, and water in the soil is discharged more thoroughly.

Referring to FIGS. 1, 2 and 3, the present invention further provides a method for consolidating hydraulic reclamation silt by using the system for consolidating hydraulic reclamation silt by combined flocculation and deep boosted vacuum preloading, comprising the following steps of:

A. activating a slurry delivery device to deliver slurry to an agitation tank 1, adding a flocculant into a flocculant preparation tank 2 to mix with water at a certain ratio, and quantitatively delivering the flocculant to the agitation tank 1 according to the delivery amount of the slurry;

B. activating the agitation tank 1 to agitate and mix the slurry with the flocculant;

C. delivering the agitated slurry to a precipitation zone of a dehydration tank 3, standing the slurry to form slurry in a lower layer and clear water in an upper layer within the precipitation zone 6, and feeding clear water into a water storage zone 16 through a drainage plate 14 and then draining the clear water to a reservoir 18 via a second delivery pipe 17;

D. after the clear water is drained, opening a tank bottom valve 8 to allow water in the slurry to further flow into a discharge zone 12 through weep holes on filter plates 9, and draining the water into the reservoir 18 through a water pumping port in the discharge zone 12 and a third delivery pipe 20;

E. controlling a telescopic rod 11 of a hydraulic cylinder 10 to open the filter plates 9, discharging the slurry, and delivering the slurry into the deep boosted drainage tank through pipelines;

F. allowing a delivery pipe 24 with ballheads 25 to pass through a sleeve 29 to connect a metal drill bit 28, allowing the sleeve 29 to be in threaded connection to the metal drill bit 28, and striking the sleeve 29 with the metal drill bit 28 into deep soil by a striking device;

G. reversely turning the sleeve 29 to separate the sleeve 29 from the metal drill bit 28, pulling the sleeve 29 out from the soil, and repeating the operations in the steps A and B to strike all the metal drill bit 28, the ballheads 25 and the delivery pipe 24 into the soil;

H. sealing the soil, and connecting double channels of the delivery pipe 24 to the vacuum preloading drainage system and the boosting system, respectively;

I. activating a pumping and drainage device 31 in the vacuum preloading drainage system to preliminarily drain water in the soil; and J. activating a boosting and air-filling device 32 in the boosting system together with the pumping and drainage device to apply air and a pressure to the soil through the channels in the delivery pipe 24 and the ballheads 25 so that the air filled into the soil squeezes the surrounding water into the pumping and drainage device to be then drained and collected through the pumping and drainage device.

In the method, the deep boosted drainage system is provided with a flocculant delivery device. Before the step H, the flocculant delivery device may be first connected to the pipelines in the pumping and drainage system and the pipelines in the boosting system and then activated to deliver the flocculant to the soil, and subsequently, the flocculant delivery device is disconnected from the pipelines. In this way, the flocculant may be fed into the deep soil more sufficiently and distributed in the soil uniformly, so that water may be more thoroughly discharged after the soil is further flocculated.

In the method, water in the flocculated slurry is drained for two times. During the first water drainage, clear water in the clear water zone after layering the slurry is drained to the reservoir. During the second water drainage, the tank bottom value 8 is opened, and the slurry is accumulated on the filter plates 9; then, water is drained into the discharge zone 12 through the weep holes on the filter plates 9, and then drained into the reservoir 18 through the water pumping port and the third delivery pipe 20. After the two times of water drainage, water in the slurry is drained more thoroughly. Water is further collected, after the slurry is delivered to the deep boosted drainage tank 22 and further treated by deep boosting, so that the soil may be directly used in the landfill of earthwork.

The invention claimed is:

1. A system for consolidating hydraulic reclamation silt by combined flocculation and vacuum preloading, comprising an agitation tank, the agitation tank being connected to a flocculant preparation tank and a slurry delivery device, characterized in that the agitation tank is connected to a dehydration tank via a first delivery pipe with a first delivery pump provided thereon; a precipitation zone is formed in an upper portion of the dehydration tank; a lower delivery port is provided at a lower end of the precipitation zone; a tank bottom valve and a filter plate mechanism are successively arranged at the lower delivery port; the filter plate mechanism comprises filter plates which can be turned to open or close; weep holes are formed on the filter plates; the opening or closing of the filter plates is controlled by a hydraulic cylinder having a telescopic rod; there is a discharge zone below the precipitation zone of the dehydration tank; a discharge valve is provided on the bottom of the discharge zone; a drainage plate is provided on an upper side wall of the precipitation zone; a water storage coaming is provided outside the drainage plate; the water storage coaming and the drainage plate are enclosed to form a water storage zone; the water storage zone is connected to a reservoir via a second delivery pipe with a second delivery pump provided thereon; a water pumping port is provided within the discharge zone; the water pumping port is connected to the reservoir via a third delivery pipe with a third delivery pump provided thereon; and, the discharge valve below the discharge zone is connected to a drainage tank.

2. The system for consolidating hydraulic reclamation silt by combined flocculation and vacuum preloading according to claim 1, characterized in that the drainage tank comprises a vacuum preloading drainage system and a boosting system; both the vacuum preloading drainage system and the boosting system realize pressurization and water drainage by a boosted pumping and drainage pipe; the boosted pumping and drainage pipe comprises a delivery pipe with double pipelines; ballheads having through holes densely distributed thereon are provided on the delivery pipe; each ballhead is at least communicated with one of the double pipelines; the double pipelines are connected to the boosting system and a pumping and drainage system above the soil, respectively; a metal drill bit is provided at a lower end of the delivery pipe; a rear portion of the metal drill bit is in threaded connected to a sleeve; the metal drill bit is provided with at least two baffles; and, both the delivery pipe and the ballheads are located within the sleeve.

3. The system for consolidating hydraulic reclamation silt by combined flocculation and vacuum preloading according to claim 2, characterized in that the ballheads comprise boosting ballheads and pumping and drainage ballheads, and the boosting ballheads and the pumping and drainage ballheads are successively distributed in a height direction at intervals.

4. A method for consolidating hydraulic reclamation silt by using the system for consolidating hydraulic reclamation silt by combined flocculation and vacuum preloading of claim 2, comprising the following steps of:

A. activating a slurry delivery device to deliver slurry to an agitation tank, adding a flocculant into a flocculant preparation tank to mix with water at a certain ratio, and quantitatively delivering the flocculant to the agitation tank according to the delivery amount of the slurry;

B. activating the agitation tank to agitate and mix the slurry with the flocculant;

C. delivering the agitated slurry to a precipitation zone of a dehydration tank, standing the slurry to form slurry in a lower layer and clear water in an upper layer within the precipitation zone, and feeding clear water into a water storage zone through a drainage plate and then draining the clear water to a reservoir via a second delivery pipe;

D. after the clear water is drained, opening a tank bottom valve to allow water in the slurry to further flow into a discharge zone through weep holes on filter plates, and draining the water into the reservoir through a water pumping port in the discharge zone and a third delivery pipe;

E. controlling a telescopic rod of a hydraulic cylinder to open the filter plates, discharging the slurry, and delivering the slurry into the drainage tank through pipelines;

F. allowing a delivery pipe with ballheads to pass through a sleeve to connect a metal drill bit, allowing the sleeve to be in threaded connection to the metal drill bit, and striking the sleeve with the metal drill bit into deep soil by a striking device;

G. reversely turning the sleeve to separate the sleeve from the metal drill bit, pulling the sleeve out from the soil, and repeating the operations in the steps A and B to strike all the metal drill bit, the ballheads and the delivery pipe into the soil;

H. sealing the soil, and connecting double channels of the delivery pipe to the vacuum preloading drainage system and the boosting system, respectively;

I. activating a pumping and drainage device in the vacuum preloading drainage system to preliminarily drain water in the soil; and J. activating an air-filling device in the system together with the pumping and drainage device to apply air and a pressure to the soil through the channels in the delivery pipe and the ballheads so that the air filled into the soil squeezes the surrounding water into the pumping and drainage device to be then drained and collected through the pumping and drainage device.

5. The method according to claim 4, characterized in that the drainage system is provided with a flocculant delivery device; before the step H, the flocculant delivery device is first connected to the pipelines in the pumping and drainage system and the pipelines in the boosting system and then activated to deliver the flocculant to the soil, and subsequently, the flocculant delivery device is disconnected from the pipelines.

6. The system for consolidating hydraulic reclamation silt by combined flocculation and vacuum preloading according to claim 1, characterized in that the filter plates comprise two opposed filter plates, the bottom of each of the filter plates is hinged to an end of the telescopic rod, and a lower end of the hydraulic cylinder is hinged to a side wall of the dehydration tank.

* * * * *